United States Patent
Korn et al.

(10) Patent No.: US 9,032,619 B2
(45) Date of Patent: May 19, 2015

(54) COMPRESSOR STATOR CHORD RESTORATION REPAIR METHOD AND APPARATUS

(75) Inventors: Nathan D. Korn, Singapore (SG); Mohamed Salleh Najib, Singapore (SG)

(73) Assignee: Pratt & Whitney Services PTE LTD., Singapore (SG)

( * ) Notice: Subject to any disclaimer, the term of this patent is extended or adjusted under 35 U.S.C. 154(b) by 1245 days.

(21) Appl. No.: 12/389,999

(22) Filed: Feb. 20, 2009

(65) Prior Publication Data

US 2009/0282677 A1 Nov. 19, 2009

(30) Foreign Application Priority Data

May 14, 2008 (SG) .................. 200803681-6

(51) Int. Cl.
*B23P 6/00* (2006.01)
*B24B 31/02* (2006.01)
*F01D 5/00* (2006.01)
*F04D 29/54* (2006.01)
*F04D 29/64* (2006.01)

(52) U.S. Cl.
CPC ............ *B23P 6/007* (2013.01); *Y10T 29/49318* (2015.01); *B24B 31/02* (2013.01); *F01D 5/005* (2013.01); *F04D 29/542* (2013.01); *F04D 29/644* (2013.01); *F05D 2230/30* (2013.01); *F05D 2250/70* (2013.01); *F05D 2230/10* (2013.01)

(58) Field of Classification Search
USPC .................. 29/889.1, 402.11, 402.09, 402.07, 29/402.06; 451/386
See application file for complete search history.

(56) References Cited

U.S. PATENT DOCUMENTS

| | | | |
|---|---|---|---|
| 2,680,286 A | | 6/1954 | Willgoos |
| 2,947,124 A | * | 8/1960 | Madigan et al. ................. 451/35 |
| 3,932,243 A | * | 1/1976 | Chang et al. ................... 216/103 |
| 4,022,542 A | * | 5/1977 | Barbeau ....................... 416/97 A |
| 4,563,239 A | * | 1/1986 | Adinolfi et al. .................. 216/91 |
| 4,747,237 A | | 5/1988 | Giebmanns |
| 5,055,752 A | | 10/1991 | Leistensnider et al. |
| 5,063,662 A | | 11/1991 | Porter et al. |
| 5,288,209 A | | 2/1994 | Therrien et al. |
| 5,476,415 A | * | 12/1995 | Nishimura et al. ........... 451/326 |

(Continued)

FOREIGN PATENT DOCUMENTS

WO WO2006/094935 A1 9/2006

OTHER PUBLICATIONS

"Compressor Airfoils and Fan Blades—New Repairs and Reduced Turn-Times", from http:wwwamtonline.com/articles/1999/AMT_06-99-2b . . . , Jun. 1999 (4 pages).

(Continued)

*Primary Examiner* — Alexander P Taousakis
(74) *Attorney, Agent, or Firm* — Kinney & Lange, P.A.

(57) ABSTRACT

A method for defining an airfoil with a radiused shape edge includes joining a filler material to the airfoil such that the filler material defines excess material that extends beyond an operational condition edge location of the edge of the airfoil, placing the airfoil within a barrel, providing an abrasive finishing media in the barrel with the airfoil, rotating the barrel to produce relative motion between the abrasive finishing media and the airfoil. Contact between the abrasive finishing material and the airfoil facilitates removing the excess material that extended beyond the operational condition edge location of the edge of the airfoil.

12 Claims, 6 Drawing Sheets

(56) References Cited

U.S. PATENT DOCUMENTS

| | | | |
|---|---|---|---|
| 5,584,662 | A | 12/1996 | Mannava et al. |
| 6,049,978 | A * | 4/2000 | Arnold .................. 29/889.1 |
| 6,106,204 | A | 8/2000 | Dansereau et al. |
| 6,203,847 | B1 * | 3/2001 | Conner et al. ............ 427/142 |
| 6,220,947 | B1 | 4/2001 | Wheat et al. |
| 6,299,509 | B2 | 10/2001 | Wheat et al. |
| 6,490,791 | B1 | 12/2002 | Surace et al. |
| 6,520,838 | B1 | 2/2003 | Shaw |
| 6,658,077 | B2 | 12/2003 | Alsmeyer et al. |
| 7,032,279 | B2 | 4/2006 | McCarvill et al. |
| 7,089,664 | B2 | 8/2006 | Ohishi |
| 7,249,412 | B2 * | 7/2007 | Wayte et al. ............ 29/889.1 |
| 8,701,287 | B2 | 4/2014 | Holze et al. |
| 8,728,391 | B2 * | 5/2014 | Bhowal et al. .............. 420/8 |
| 2005/0091847 | A1 | 5/2005 | Beneteau et al. |
| 2007/0007260 | A1 | 1/2007 | Steinhardt |
| 2007/0157447 | A1 | 7/2007 | Prevey |

OTHER PUBLICATIONS

Tipton "3P High Performance Media" from http://www.tiptonus.com/3P.aspx, visited Mar. 18, 2008 (1 page).

Vibra Finish Wuxi Company "Centrifugal Barrel Finishing Machine" from http://www.topabrasive.com/vibrafinish/li.html, visited Mar. 18, 2008 (2 pages).

D. A. Rutz, "Manufacturing Methods for Engine Blade Repair", Technical Report AFML-TR-74-275, Mar. 1975 (144 pages).

"SWECO Vibro-Energy Finishing Mills Model FM-10-V and FM-10-C Batch Units", Product Information Sheet of Mar. 19, 2008 (2 pages).

"SWECO—Finishing Mills, Deburring and Burnishing Machines", from http://www.sweco.com/vibratory_finishing_batch_fm10c.html, visited Mar. 19, 2008 (1 page).

Vibra Finish Company, "Plastic Media-Shapes & Sizes" product sheet as of Mar. 18, 2008.

* cited by examiner

COMPRESSOR STATOR CHORD RESTORATION REPAIR METHOD AND APPARATUS

BACKGROUND

The present invention relates to airfoil repair methods and apparatuses, and more particularly to methods and apparatuses for airfoil chord repairs that involve restoring radiused leading and trailing edges.

Gas turbine engines utilize airfoils, including compressor stators (or vanes), that interact with fluid flows through the engine. During use, those airfoils can become worn or damaged. For instance, it is common for wear or damage at leading and trailing edges of airfoils to occur. Worn or damaged airfoils can be replaced in order to keep the engine in service. Alternatively, the worn or damaged airfoils can be repaired to keep the original airfoils in service in the engine, which can provide significant cost savings over the use of replacement parts.

A known repair for airfoil leading and trailing edges involves removing parent material of the airfoil at the location of the damage or wear, adding filler material to replace the removed parent material, performing a coining (or forging) operation on the filler material, and then machining the coined filler material to original blueprint dimensions. However, this known repair method has drawbacks. For instance, in order to machine leading and trailing edges to original blueprint dimensions, a relatively expensive robotic adaptive blending machine is typically required, such as a 5-axis computer numeric controlled (CNC) automated blending machine with a vision system that can cost on the order of $1 million U.S. dollars.

Vibratory finishing processes are known for processing edges of airfoils using a media placed in a vibration bowl with the airfoil. However, these known vibratory finishing processes are primarily for polishing, and may be inadequate, or at a minimum inefficient, for restoring airfoil edges following a coining operation.

SUMMARY

A method for defining an airfoil with a radiused shape edge includes joining a filler material to the airfoil such that the filler material defines excess material that extends beyond an operational condition edge location of the edge of the airfoil, placing the airfoil within a barrel, providing an abrasive finishing media in the barrel with the airfoil, rotating the barrel to produce relative motion between the abrasive finishing media and the airfoil. Contact between the abrasive finishing material and the airfoil facilitates removing the excess material that extended beyond the operational condition edge location of the edge of the airfoil.

An assembly for abrasively forming a radiused edge on an airfoil includes a barrel in which the airfoil is positioned and an abrasive media mixture placed in the barrel to remove material from the airfoil when the barrel is rotated. The abrasive media mixture includes a particulate material having generally pyramid-shaped particles with an average particle size of approximately 10 mm by 10 mm by 10 mm (⅜ inch by ⅜ inch by ⅜ inch), water and a detergent.

DETAILED DESCRIPTION

Figure 1:
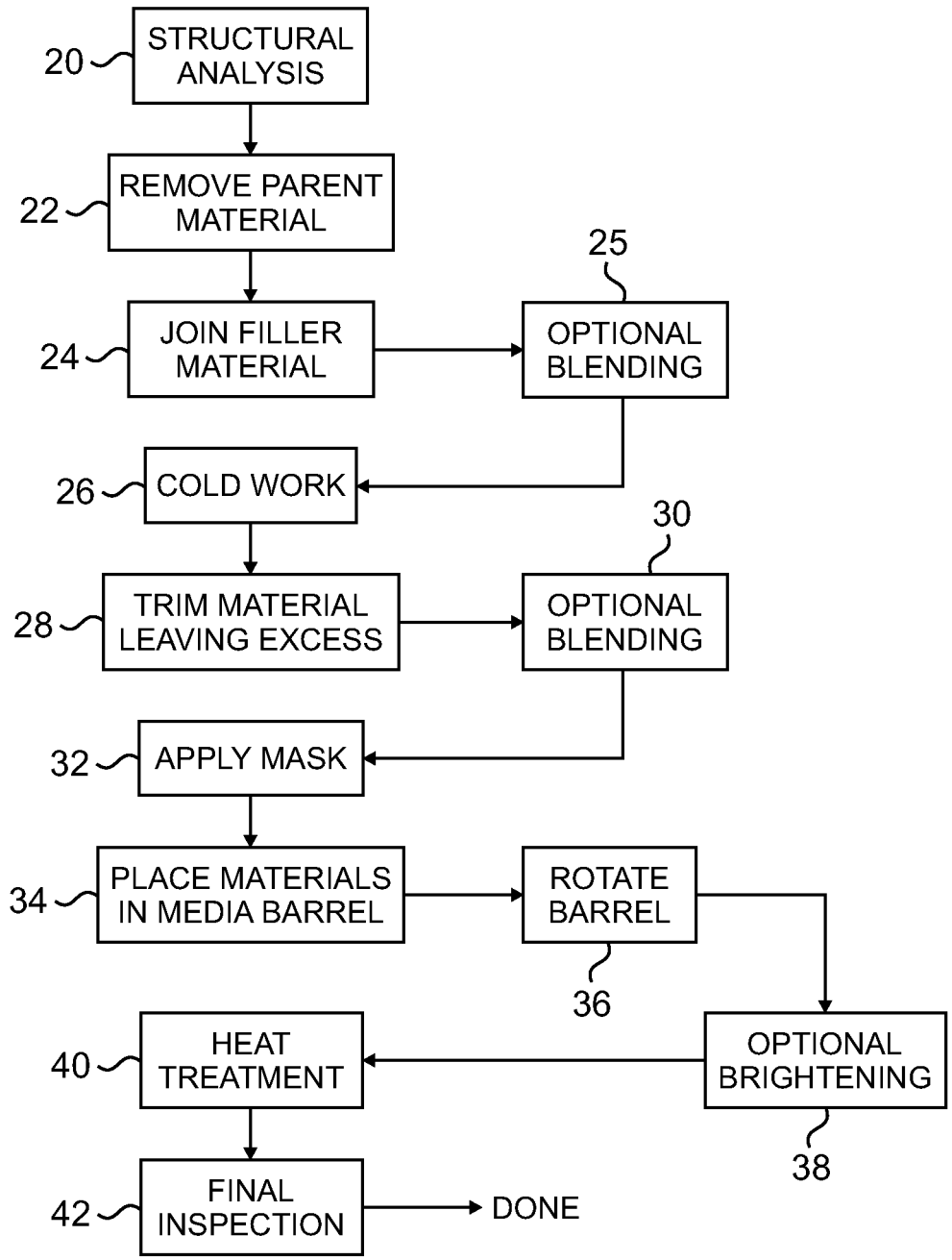
FIG. 1 is a flow chart of an exemplary repair method.

FIG. 1 is a flow chart of an exemplary repair method for chord restoration of an airfoil (e.g., a compressor stator) for a gas turbine engine. The method is applicable to repairing airfoils having damage or wear at a radiused leading edge and/or trailing edge, that is, a leading or trailing edge with a profile defined by a radius swept through a given angle about an axis. After a damaged and/or worn airfoil is removed from an engine, a structural analysis is first performed to identify the location of damage and/or wear to the airfoil. The structural analysis also facilitates identifying high stress locations on the airfoil. Such high stress locations are generally structurally weaker as compared to other lower stress locations of the airfoil. Because an interface where filler material is joined to parent material of the airfoil during repair is also known to be a relatively weak location of the repaired airfoil structure, intersection of repair boundaries with the identified high stress locations may be avoided. The structural analysis further facilitates identifying a suitable manner in which to remove the damaged and/or worn region of the airfoil without unduly weakening the structural integrity of the airfoil (step 20).

Following structural analysis, parent material of the airfoil is removed at the worn or damaged area(s) as a function of the structural analysis (step 22). Parent material of the airfoil is removed from at least one region at a leading edge or trailing edge of the airfoil, thereby removing parent material past an original blueprint or engine manual serviceable limit dimension of a given edge of the airfoil, that is, past a predefined operational condition edge location of a given edge of the airfoil. Material removal may be accomplished using machining, grinding, or any other suitable techniques. Next, a filler material is joined to the parent material of the airfoil at the location where parent material was removed (step 24). The filler material is applied beyond the operational condition edge location (i.e., the original blueprint or engine manual serviceable limit edge location) of the airfoil edge, in order to build-up a suitable amount of the filler material with some excess. In one embodiment, the filler material is added to a thickness of approximately 120-140% of the desired finished thickness at the operational condition edge location. The filler material may be joined to the parent material of the airfoil using laser clad welding, micro metal inert gas (micro MIG) welding, micro plasma transferred arc (micro-PTA) powder cladding, or other suitable processes that facilitate limiting a heat affected zone (HAZ) produced by the joining process. After the step of joining the filler material, some optional, limited pre-machining (e.g., manual or automated blending) may be performed to ensure a desired thickness ratio of the filler material to the parent material of the airfoil (step 25).

Cold working of the airfoil with the joined filler material is then performed (step 26). In one embodiment, the cold working is coining (i.e., forging), which can be performed in stages with optional removal of excess filler material between stages of the coining process. Next, the filler material is trimmed leaving a sufficient amount of excess filler material beyond the operational condition edge location (i.e., the original blueprint or engine manual serviceable limit edge location) of the airfoil (step 28). Where the airfoil has a radiused edge, the filler material is removed with a straight cut perpendicular to a mean chord line of the airfoil (see FIG. 2). More particularly, material is removed along a line parallel to a tangent line that intersects the operational condition edge location of the airfoil, and where the edge is a leading edge the tangent line is located at a stagnation point along the operational condition edge location of the airfoil. In one embodiment, excess filler material is left to a thickness of approximately 0.127 mm (0.005 inch) beyond the operational condition edge location of the airfoil. The filler material may be removed during this step using machining or other known techniques. Next, manual or automated blending may optionally be performed in order to smooth any step formations or rough edges produced by the filler material and remaining after the coing operation (step 30). The manual blending at this step is typically minimal, and is used to bring the airfoil to original blueprint or engine manual serviceable limit dimensions except at the leading and trailing edges where excess filler material remains that may be removed by a media finish operation as described below.

The repaired edge of the airfoil may be restored to original blueprint or engine manual serviceable limit dimensions, which may include a radiused edge. For example, an abrasive media mixture may be used to remove excess filler material and shape the filler material to the operational condition edge location of the airfoil. Initially, a mask is applied to the airfoil to protect selected areas of the airfoil, such as a root portion, attachment feet, a platform, etc., from contact with the abrasive media mixture (step 32). The mask may include protective fixture block (see FIG. 3), and may further include tape (e.g., vinyl tape) adhered to the airfoil at areas not covered by the fixture block. Once masked, the airfoil is secured within a barrel along with the abrasive media mixture enabling the abrasive media mixture to come into contact with the airfoil (step 34) (see FIG. 4 and FIG. 5). The abrasive media mixture may include, for example, a particulate material, a detergent and water all placed in the barrel. The composition of the abrasive media mixture is described further below. Next, the barrel containing the airfoil and the abrasive media mixture is rotated using, for example, a centrifugal barrel finishing machine (step 36). Movement of the barrel induces relative movement between the airfoil and the abrasive media mixture (see FIG. 6), such that the particulate material in the abrasive media mixture contacts the airfoil to remove portions of the filler material to facilitate returning the airfoil to original blueprint or engine manual serviceable limit dimensions (see FIG. 7), for instance, restoring a radiused edge shape in the filler material at the operational condition edge location of the airfoil. The detergent in the abrasive media mixture may act as a wetting agent, a corrosion inhibitor, and/or a polishing agent.

After the processing the airfoil using the abrasive media mixture, the airfoil may optionally undergo a brightening process (step 38). The brightening process may involve placing a brightening media mixture in the barrel with the airfoil and rotating the barrel in a manner similar to that described above with respect to the abrasive media mixture.

Next, the airfoil may undergo heat treatment, as desired (step 40). Lastly, the airfoil undergoes a final inspection to ensure that the repair has returned the airfoil to a condition suitable for return to service (step 42). The repair is then completed, and the airfoil may be returned to service in an engine.

Figure 2:
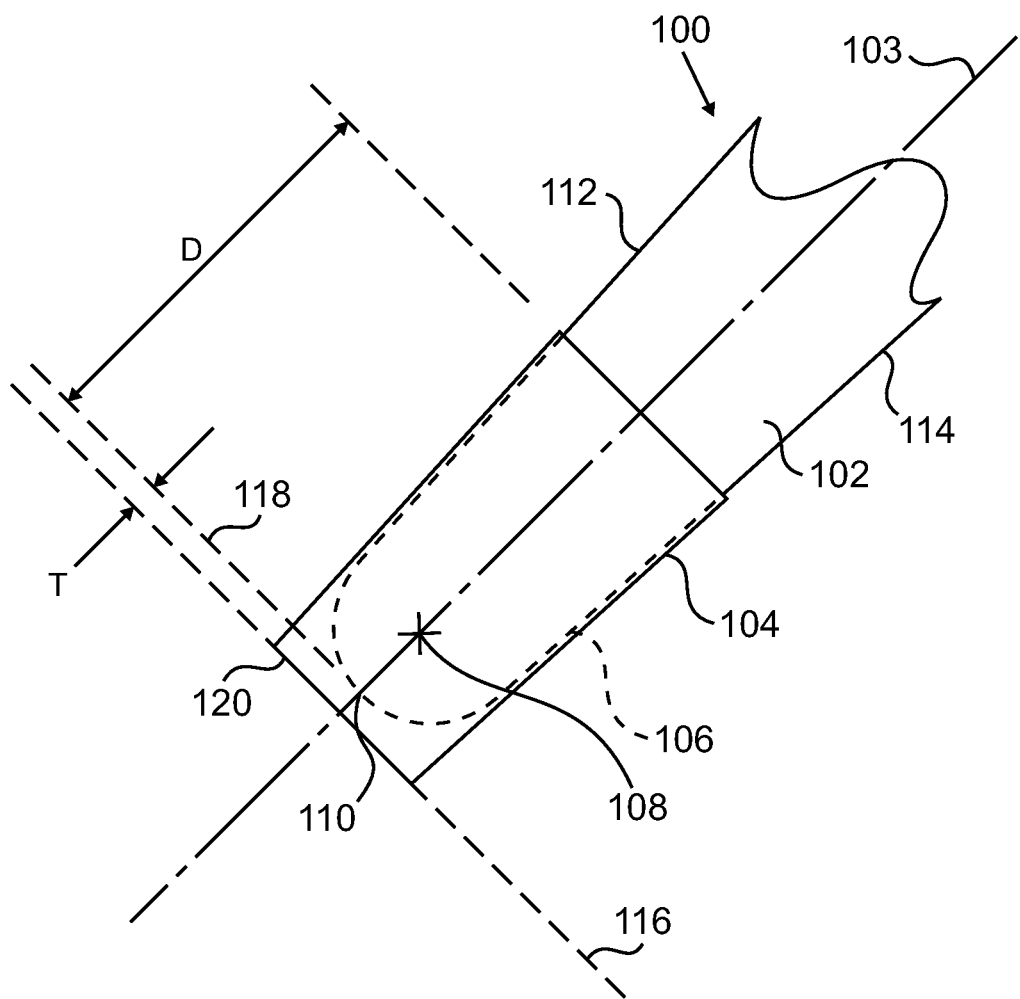
FIG. 2 is a schematic cross-sectional view of an airfoil leading edge portion during the exemplary repair method.

FIG. 2 is a schematic cross-sectional view of a leading edge portion of an exemplary airfoil 100 during repair, subsequent to a coining operation performed on the airfoil 100. The airfoil 100 includes parent material 102 and defines a mean chord line 103. As shown in FIG. 2, a portion of the parent material 102 has been removed in order to remove worn and/or damaged areas of the edge of the airfoil 100. A filler material 104 is joined to the parent material 102 where the portion of the parent material 102 was removed. An operational condition edge location (i.e., the original blueprint or engine manual serviceable limit edge location) 106 is shown in phantom superimposed on the filler material 104 in FIG. 2, illustrating one embodiment of a final radiused leading edge configuration for a completed airfoil repair. The operational condition edge location 106 includes a radiused nose portion defined about a center of curvature 108. A stagnation point 110 is defined along the operational condition edge location 106. It should be noted that although FIG. 2 illustrates a leading edge portion of an airfoil, the exemplary repair method is also applicable to a trailing edge location.

In the illustrated embodiment of FIG. 2, the parent material 102 has been removed to a depth D beyond the operational condition edge location 106 in the direction of the mean chord line 103, and the parent material 102 has remained at operational condition locations (i.e., at original blueprint or engine manual serviceable specifications) along opposed sidewalls 112 and 114 (i.e., pressure and suction sides) of the airfoil 100 downstream from the filler material 104. In one embodiment, the distance D can be approximately 2.54 mm (0.100 inch). The filler material 104 may be joined to the parent material 102 to a thickness of approximately 120-140% of a finished thickness of the operational condition edge location 106. As illustrated, the filler material 104 has been applied to generally a thickness beyond the operational condition edge location 106 with respect to the sidewalls 112 and 114 of the airfoil 100, and a forging or coining operation has formed the filler material 104 to a shape very close to the operational condition edge location 106 over most of the repair area. Some limited manual or automated blending may be performed to achieve the final geometry. As shown in FIG. 2, a cut has been made in the filler material 104 along a line 116 that is located parallel to a tangent line 118 that intersects the operational condition edge location 106 at the stagnation point 110. The cut forms a planar face 120 in the filler material 104 adjacent to the operational condition edge location 106. A straight cut forming the planar face 120 is relatively simple to achieve, and generally does not require complex and expensive machining equipment of the type that would be required to machine the filler material 104 to the operational condition edge location 106 according to prior art methods. Formation of the planar face 120 leaves an excess of the filler material 104 to a thickness T beyond the operational condition edge location 106, and with a non-radiused shape. In one embodiment, the thickness T is approximately 0.127 mm (0.005 inch).

Figure 3:
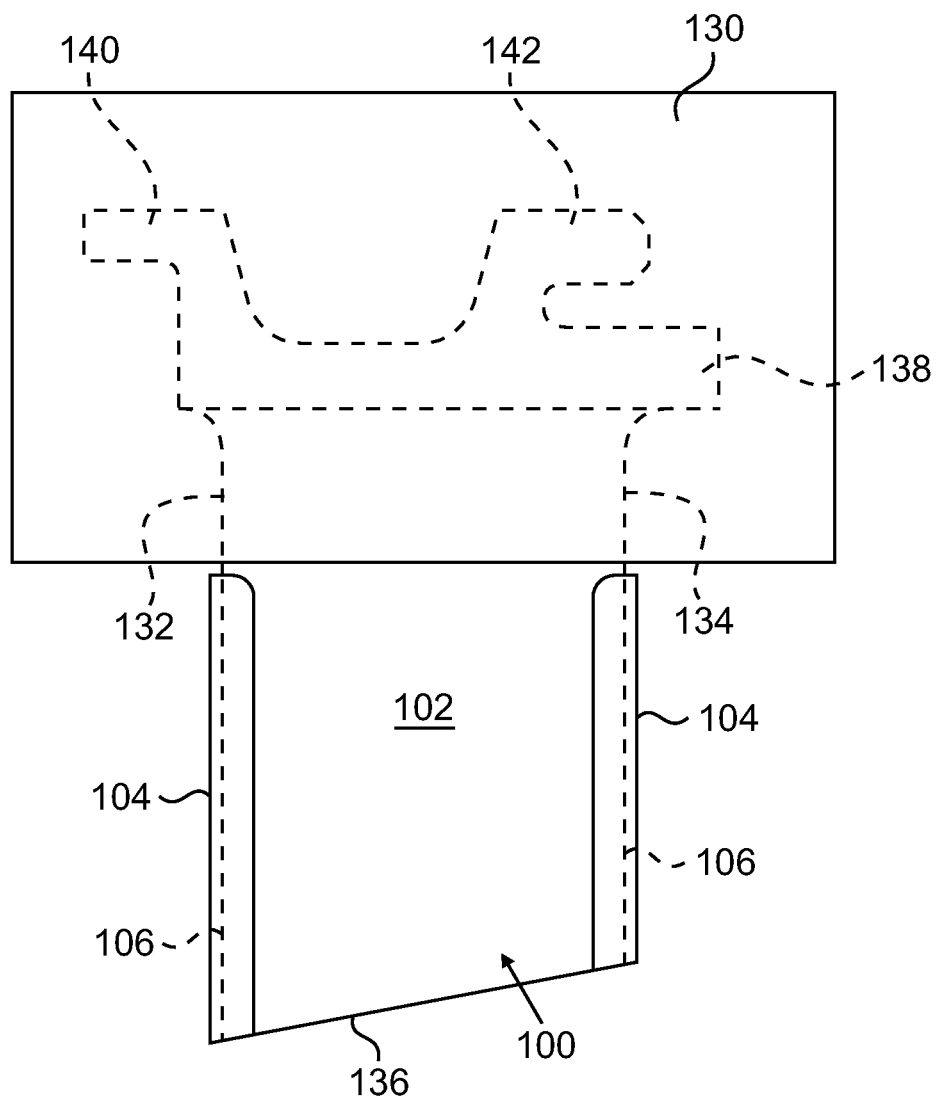
FIG. 3 is a side elevation view of an airfoil with a mask fixture during repair.

FIG. 3 is a side elevation view of the airfoil 100 during repair with a mask fixture 130 affixed thereto subsequent to a coining operation. In the illustrated embodiment, the filler material 104 forms elongate strips at both a leading edge 132 and a trailing edge 134, both extending to a tip 136 of the airfoil 100. The airfoil includes a platform 138 and a pair of feet 140 and 142 located opposite the tip 136. The feet 140 and 142 are secured within the mask fixture 130, and the platform 138 is covered by the mask fixture 130. Once affixed, the mask fixture 130 covers portions of the airfoil 100 to help protect those portions from exposure to abrasive media mixture particles, for example. Portions of the airfoil 100 not covered by the mask fixture 130 but still desired to be masked may be covered by adhesive tape, such as a conventional vinyl tape. In one embodiment, exposed portions of the platform 138 of the airfoil 100 not covered by the mask fixture 130 are covered with adhesive vinyl tape. It should be noted that the mask fixture 130 may accommodate multiple airfoils 100 simultaneously affixed adjacent to each other in a desired arrangement.

Figure 4:
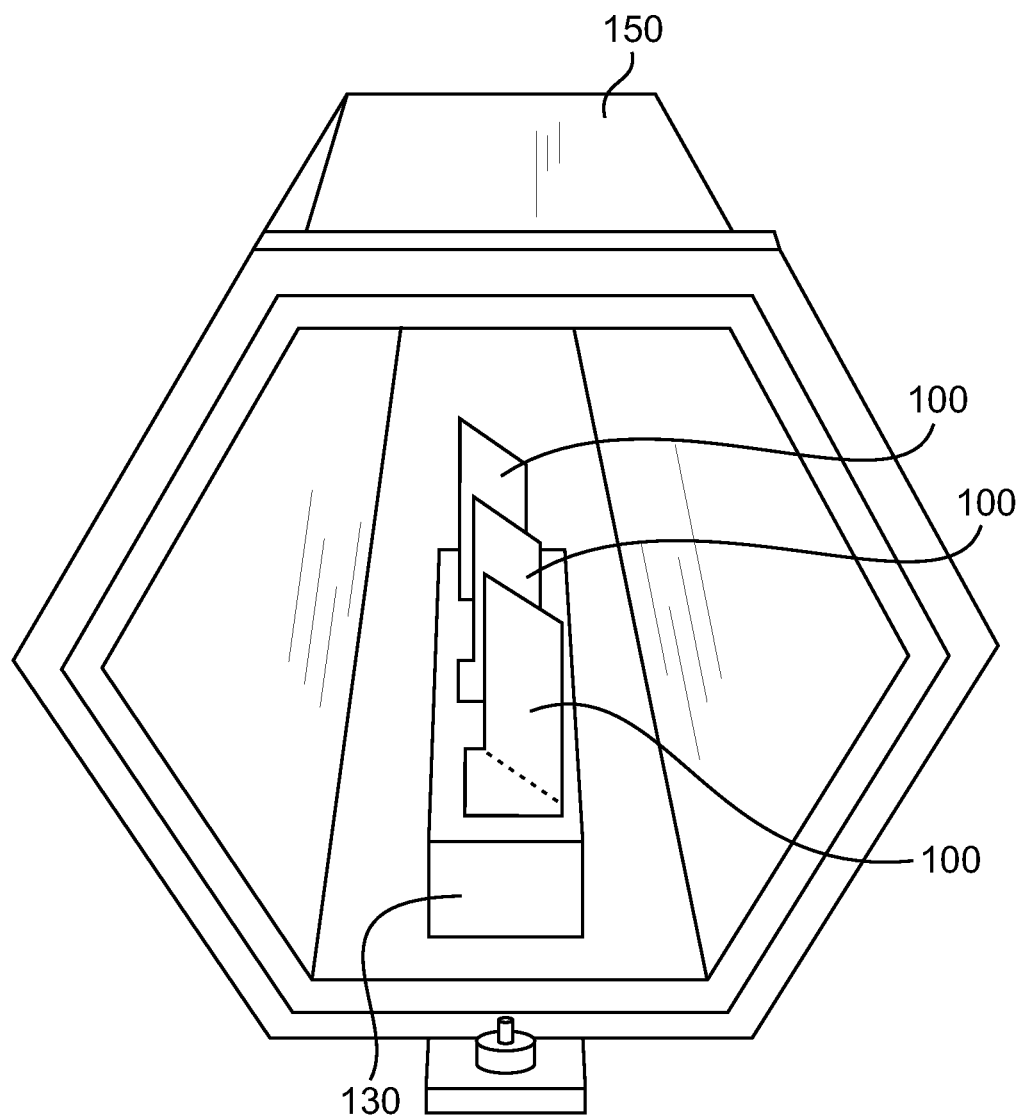
FIG. 4 is a perspective view of a barrel with airfoils mounted to a fixture placed therein, shown with a cover of the barrel removed to expose an interior of the barrel.

As described above, the exemplary repair may involve material removal with an abrasive media mixture that is placed in a barrel with the airfoil 100. FIG. 4 is a perspective view of a barrel (or container) 150 with a number of airfoils 100 mounted to the mask fixture 130 placed therein. The barrel 150 includes a cover (not shown) that is removed to expose an interior of the barrel 150. In the illustrated embodiment, the barrel 150 has a hexagonal profile with a twenty liter capacity, and the mask fixture 130 is secured to a sidewall of the barrel 150. In this way the airfoils 100 secured to the mask fixture 130 extend inward from the sidewall of the barrel 150. In further embodiments, multiple mask fixtures 130 each retaining one or more airfoils 100 may be secured within the barrel 150, though for some applications it may be desirable to limit the number of airfoils 100 in the barrel 150 to fifteen or less. It should be appreciated that the barrel 150 may include any profile shape with any capacity capable of containing the airfoil and/or abrasive media mixture.

Figure 5:
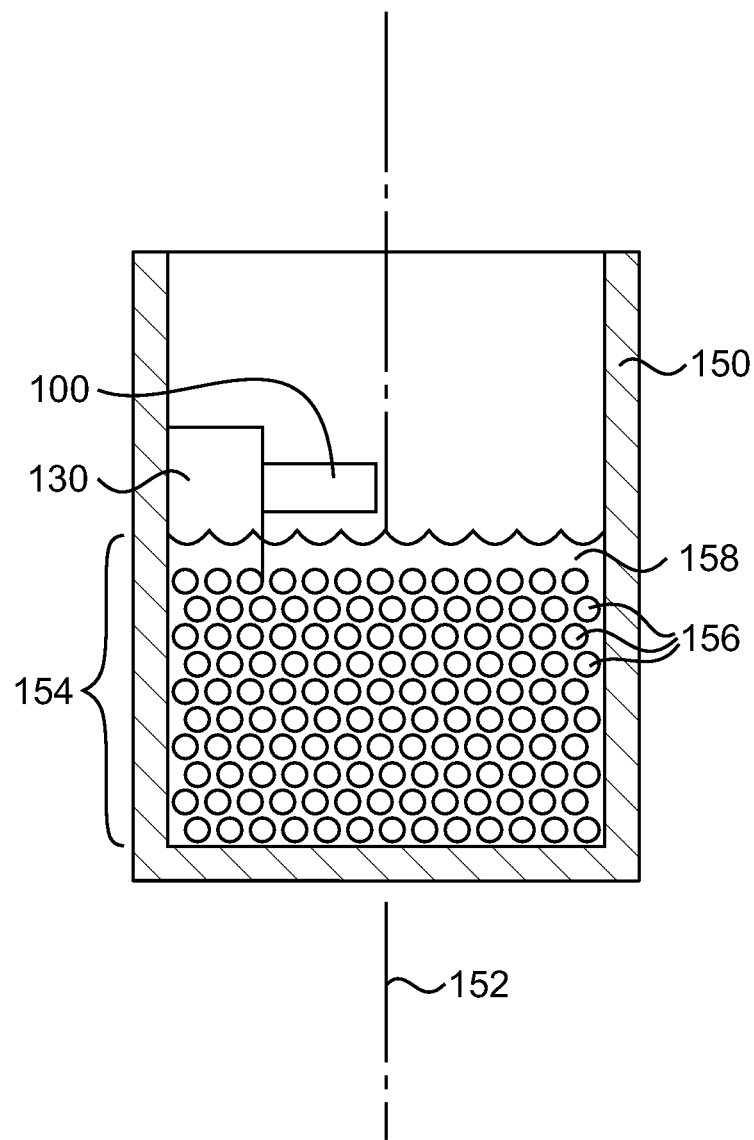
FIG. 5 is a schematic cross-sectional view of the barrel with airfoils mounted to the mask fixture and an abrasive media mixture placed therein.

FIG. 5 is a schematic cross-sectional view of the barrel 150 positioned relative to a central axis 152 with the airfoils 100 (only one airfoil 100 is visible in FIG. 5) mounted to the mask fixture 130 and an abrasive media mixture 154 placed therein. The abrasive media mixture 154 includes a particulate material 156, cold water and a detergent (the water and the detergent are collectively designated by reference number 158).

The particulate material 156 may be pyramid-shaped plastic media having a 10 mm by 10 mm by 10 mm (⅜ inch by ⅜ inch by ⅜ inch) size and a specific weight of about 1.8 to about 1.9 g/cm$^3$, or more particularly about 1.85 g/cm$^3$. In one embodiment, the composition of the particulate material 156 includes, by weight, approximately 60% zircon and approximately 40% polyester, with incidental impurities. One suitable particulate material is "ZI Fast Cut (Zircon)" in a generally pyramid shape in 10 mm by 10 mm by 10 mm (⅜ inch by ⅜ inch by ⅜ inch) size, available from Vibra Finish Company, Sylmar, Calif., USA. As illustrated in FIG. 5, the particulate material 156 is added to the barrel 150 containing the airfoils 100 such that approximately half the capacity of the barrel 150 is full with the particulate material 156. That is, where the barrel 150 has a twenty liter capacity, approximately ten liters of the particulate material 156 may be used.

A volume of the water is added to the barrel 150 after the particulate material 156 has been added, to a level approximately 2.54 cm (1 inch) above a top most level of the particulate material 156 (when the barrel 150 is oriented with the central axis 152 vertical). The detergent may be a liquid detergent added to the barrel 150 at a volume of approximately 1% of the volume of the water added. In one embodiment, the detergent is in liquid form and includes propylene glycol, a surfactant, and a derivative of diethanolamine. One suitable detergent is sold under the trade name "SC-388" by SPIRE Private Ltd., Singapore.

Once the airfoil 100 has been positioned in the barrel 150 along with the abrasive media mixture 154, the barrel 150 may be covered, placed in a conventional centrifugal barrel finishing machine (not shown), and rotated to produce relative movement and contact between the abrasive media mixture 154 and the airfoils 100. Typically, the centrifugal barrel finishing machine may hold multiple barrels 150 for simultaneous rotation. A suitable centrifugal barrel finishing machine is a model "CB-60" available from Top Abrasive Company, Wuxi New District, Jiangsu, P. R. China.

Figure 6:
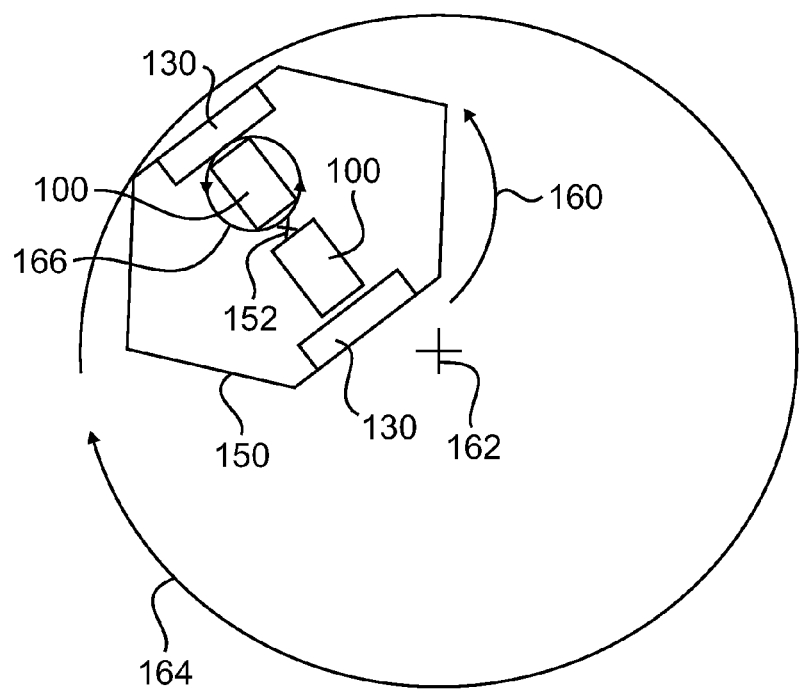
FIG. 6 is a schematic view illustrating movement of the barrel in a centrifugal barrel finishing machine.

FIG. 6 is a schematic view illustrating movement of the barrel 150 holding the mask fixtures 130 and the airfoils 100 in a centrifugal barrel finishing machine. As shown in FIG. 6, the barrel 150 is configured to rotate about the central axis 152 in a first direction 160. In the illustrated embodiment, the first direction 160 is counter-clockwise. Simultaneously, the barrel 150 is rotated about a second axis 162 (located at a distance from the barrel 150) in a second direction 164 that is opposite to the first direction 160. In the illustrated embodiment, the second direction 164 is clockwise. Thus, the barrel 150 is simultaneously counter-rotated in two directions 160 and 164 by the centrifugal finishing machine. Rotation of the barrel 150 causes the abrasive media mixture 154 (not shown in FIG. 6 for simplicity) to move and contact the airfoils 100 within the barrel 150, illustrated schematically by arrows 166, and to remove the excess of the filler material 104 that extended beyond the operational condition edge location 106 of the edge of the airfoil 100. The barrel 150 may be rotated for more than 30 minutes. In one embodiment, the barrel 150 is rotated by the centrifugal barrel finishing machine for approximately 2-3 hours at approximately 40 Hz.

Figure 7:
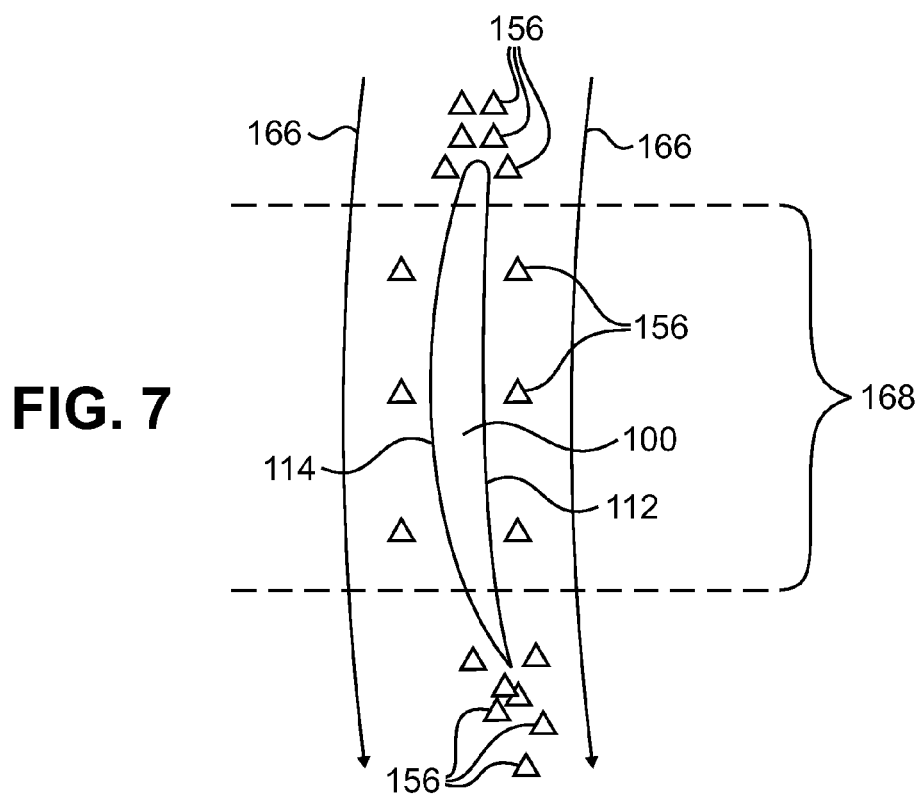
FIG. 7 is a schematic view of particulate material of the abrasive media mixture relative to the airfoil in the barrel during rotation.

FIG. 7 is a close-up schematic view of the particulate material 156 of the abrasive media mixture 154 relative to the airfoil 100 in the barrel 150 during rotation by the centrifugal barrel finishing machine. The rotational movement of the barrel 150 tends to concentrate contact between the particulate material 156 of the abrasive media mixture 154 at edges of the airfoil 100 while limiting contact along sidewalls 112 and 114 (i.e., pressure and suction sides) of the airfoil 100 in a middle region 168 located between opposite leading and trailing edges of the airfoil 100. The illustrated movement helps to produce radiused edges on the airfoil 100, while also limiting undesirable material removal at other locations on the airfoil 100, particularly along the sidewalls 112 and 114.

Once rotation of the barrel 150 in the centrifugal barrel finishing machine is complete, the airfoils 100 may be removed, washed and then proceed to any desired finishing steps, such as heat treatment, coating, and final inspection. The airfoils 100 may be washed by (a) being flushed fully with clean cold water and then air dried with filtered ambient air, or (b) fully immersed in hotter water at 66-93° C. (150-200° F.) to flash dry. The particulate material 156 may be cleaned and re-used.

As noted above, the airfoils 100 may optionally undergo a brightening process following processing with the abrasive media mixture 154. The brightening process may involve placing a brightening media in the barrel 150 with the airfoils 100 instead of the particulate material 156 and rotating the barrel 150 in a manner similar to that described above with respect to the abrasive media mixture 154 (see FIGS. 5-7). The brightening media may have random shaped particles with an average size of approximately 3.5-8.2 mm (0.138-0.323 inch), a specific gravity of approximately 2.4 g/cm$^3$, and a composition of about 93% by weight $Al_2O_3$. One suitable brightening media is sold under the trade name "3P-6" by Tipton US Corporation, Lebanon, Ohio, USA. The brightening process may be preformed by rotating the barrel 150 with the centrifugal barrel finishing machine for greater than 30 minutes at approximately 40 Hz. In one embodiment, the barrel 150 is rotated for approximately one hour to accomplish brightening.

In the disclosed embodiments, use of an abrasive media mixture facilitates reducing the amount of machining or blending required for an airfoil chord restoration or edge repair, thereby saving time and effort, compared to the prior art. Moreover, the use of an abrasive media mixture facilitates reducing capital expenditure on repair equipment by eliminating the use of more complex machining equipment like a 5-axis CNC automated blending machine with a vision system used with prior art repairs. The use of the abrasive media mixtures in a centrifugal finishing machine also facilitates faster and more efficient material removal from an airfoil as compared to use of known vibratory finishing methods, thus potentially saving hours of processing time. Additionally, the disclosed embodiments facilitates the restoration of a radiused edge of an airfoil, in contrast to other known abrasive media methods that may tend to produce elliptical edges on repaired airfoils.

Although the exemplary disclosure has been described with reference to preferred embodiments, workers skilled in the art will recognize that changes may be made in form and detail without departing from the spirit and scope of the invention. For example, it should be understood that a repair according to the present invention may include additional steps not specifically mentioned, and may be performed in conjunction with additional repairs to a given airfoil.

The invention claimed is:

1. A method for defining an airfoil with a radiused shape edge, the method comprising:
    joining a filler material to the airfoil, wherein the filler material defines excess material that extends beyond an operational condition edge location of the edge of the airfoil, wherein the operational condition edge location comprises at least one of an original blueprint edge location and engine manual serviceable limit edge location;
    performing a cold working process on the filler material joined to the airfoil;
    after the cold working process, machining a portion of the filler material such that remaining excess filler material extends beyond the operational condition edge location of the airfoil to a planar face;
    securing the airfoil within a barrel;
    providing an abrasive finishing media in the barrel with the airfoil; and
    rotating the barrel to produce relative motion between the abrasive finishing media and the airfoil, wherein contact between the abrasive finishing material and the airfoil removes the excess material that extended beyond the operational condition edge location of the edge of the airfoil to the planar face to produce the radiused shape edge.

2. The method of claim 1, wherein the step of rotating the barrel causes the abrasive finishing media to remove the excess material from at or near the edge of the airfoil with limited removal of airfoil material along a mid-chord region of the airfoil.

3. The method of claim 1 and further comprising:
    masking a portion of the airfoil to facilitate reducing contact between the masked portion of the airfoil and the abrasive finishing media.

4. The method of claim 1 and further comprising:
    removing the abrasive finishing media from the barrel with the airfoil;
    providing a brightening media in the barrel with the airfoil, wherein the brightening media comprises approximately 93% by weight $Al_2O_3$; and
    rotating the barrel to produce relative motion between the brightening media and the airfoil.

5. The method of claim 1, wherein the filler material is joined to the airfoil such that the filler material including the excess material extending beyond the operational condition edge location of the edge of the airfoil to greater than or equal to 120% of a thickness of the filler material at the operational edge location.

6. The method of claim 1, wherein the step of rotating the barrel to produce relative motion between the abrasive finishing media and the airfoil is performed for no more than approximately 2 to 3 hours.

7. The method of claim 1, wherein the step of rotating the barrel to produce relative motion between the abrasive finishing media and the airfoil comprises movement of the abrasive finishing media along a path that follows sidewalls of the airfoil and that concentrates contact between the airfoil and the abrasive finishing media at edges of the airfoil.

8. The method of claim 1, wherein the step of providing the abrasive finishing media in the barrel with the airfoil further comprises:
    combining particulate material, a volume of water and a detergent in a mixture that is provided in the barrel.

9. A method for defining an edge region of an airfoil, the method comprising:
    removing a damaged portion of the edge region of the airfoil;
    joining a filler material at the edge region of the airfoil where the damaged portion was removed, wherein the filler material defines excess material in a non-radiused shape that extends beyond a operational condition edge location of the edge region of the airfoil, wherein the operational condition edge location comprises at least one of an original blueprint edge location and engine manual serviceable limit edge location;
    performing a cold working process on the filler material joined to the airfoil;
    after the cold working process, machining a portion of the filler material such that remaining excess filler material extends beyond the operational condition edge location of the airfoil to a planar face;
    securing the airfoil within a barrel;
    providing an abrasive finishing media in the barrel with the airfoil; and
    rotating the barrel to produce relative motion between the abrasive finishing media and the airfoil, wherein contact between the abrasive finishing material and the airfoil removes the excess material and changes the non-radiused shape of the filler material to a radiused shape in order to establish the operational condition edge location of the edge region of the airfoil in the filler material.

10. The method of claim 9, wherein the step of rotating the barrel causes the abrasive finishing media to move along a path that approaches the edge of the airfoil and follows sidewalls of the airfoil to facilitate removing the excess material from at or near the edge of the airfoil with limited removal of airfoil material along the sidewalls in a mid-chord region of the airfoil.

11. The method of claim 9, further comprising:
    masking a portion of the airfoil to facilitate reducing contact between the masked portion of the airfoil and the abrasive finishing media.

12. The method of claim 9, further comprising:
    removing the abrasive finishing media from the barrel with the airfoil;

providing a brightening media in the barrel with the airfoil, wherein the brightening media comprises approximately 93% by weight $Al_2O_3$; and rotating the barrel to produce relative motion between the brightening media and the airfoil.

* * * * *